(No Model.)
C. K. MYERS.
TRAVELING THRASHER.
No. 380,342. Patented Apr. 3, 1888.
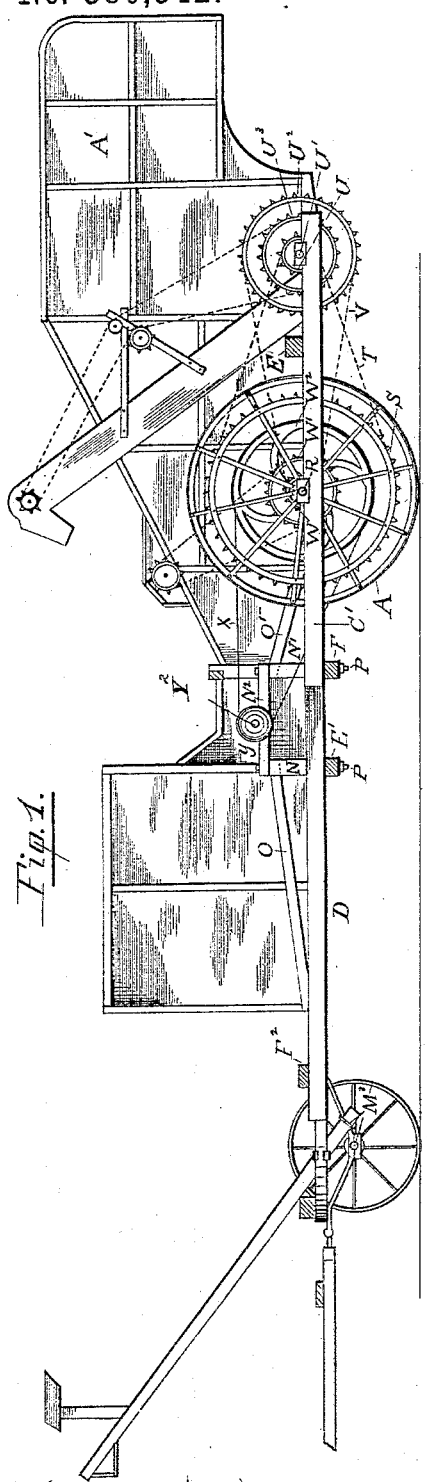
Fig. 1.
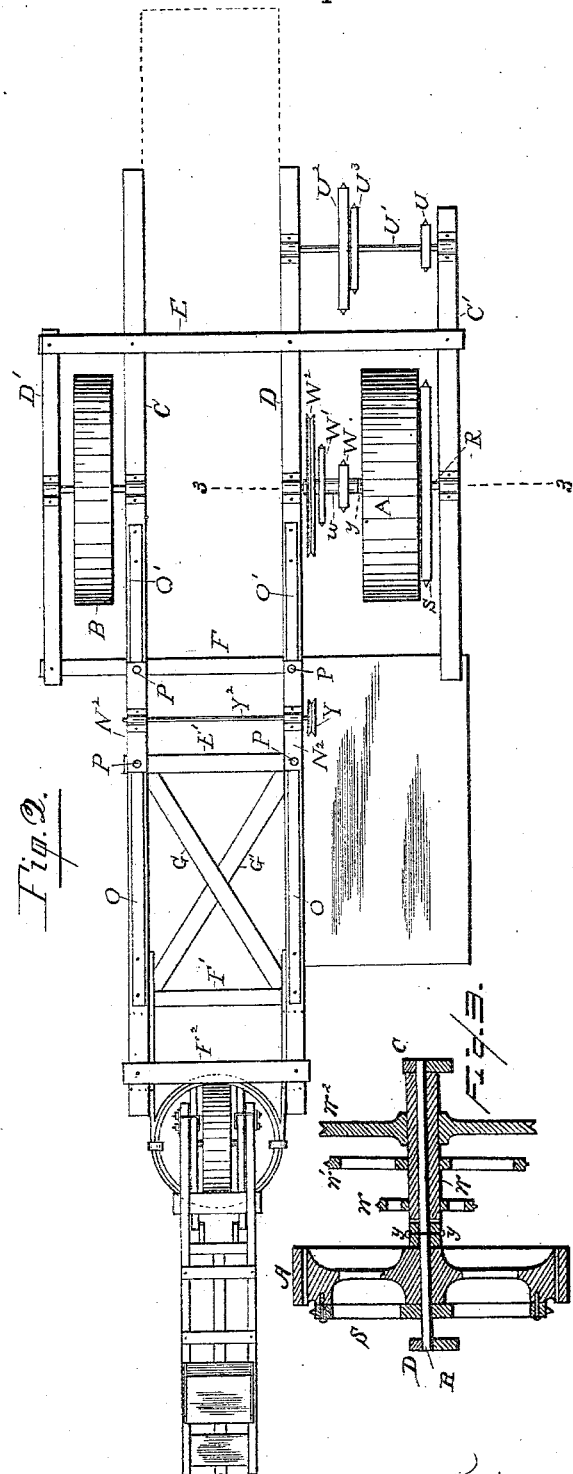
Fig. 2.
Fig. 3.
Witnesses:
Elihu B. Stowe,
Lyman W. Elliott.
Inventor:
Charles K. Myers
By Joshua B. Webster Atty.
N. PETERS. Photo-Lithographer. Washington, D. C.

UNITED STATES PATENT OFFICE.

CHARLES K. MYERS, OF STOCKTON, CALIFORNIA.

TRAVELING THRASHER.

SPECIFICATION forming part of Letters Patent No. 380,342, dated April 3, 1888.

Application filed March 4, 1887. Serial No. 229,728. (No model.)

*To all whom it may concern:*

Be it known that I, CHARLES K. MYERS, a citizen of the United States, residing at Stockton, in the county of San Joaquin, State of California, have invented certain new and useful Improvements in Traveling Thrashers, of which the following is a specification, reference being had therein to the accompanying drawings.

My invention relates to improvements in traveling thrashers to which a beading-machine may be attached for the purpose of supplying the grain, or the grain may be supplied from an accompanying detached beading-machine operated by a detached motive power.

In the accompanying drawings, Figure 1 is a side elevation of a traveling thrasher which shows my improvements. Fig. 2 is a plan of the frame, wheels, pulleys, &c. Fig. 3 is a vertical transverse section through the machine in the plane indicated by dotted lines 3 3 on Fig. 2.

The frame of the machine upon which the thrasher and operating devices are supported consists of the main longitudinal beams or sills C and D of the main cross-beams E F. C' D' are short longitudinal beams bolted, respectively, to the ends of the beams E and F. Short cross-beams E', F', and F² are bolted to the beams C and D forward of the beam F and at suitable distances to insure stiffness to that portion of the frame. The forward ends of the beams D and C are attached to a suitable independent frame-work mounted upon a supporting-wheel, J, which also performs the functions of a guide-wheel. A supporting and driving wheel, A, has its journal-bearings secured to the beams D and C'. From this wheel the motion required to actuate the different parts of the machine is derived through a suitable series of sprocket-wheels and chains, as hereinafter described.

A supporting-wheel, B, has its journal-bearings secured to beams C and D'. For the purpose of better bracing the frame of the machine from beneath, I attach one end of a diagonal cross-bar, G, at the connection of the beams C and E' and the other end at the connection of the beams D and F'. A similar bar, G', is likewise attached to the connections of beams D E' and C F'.

The cylinder-shaft Y² has its journal-bearings secured to elevated longitudinal beams N², which are attached to vertical stanchions N and N', the feet of which stanchions are secured to the sills D and C. In order to secure great rigidity to the frame at the point of location of the cylinder, I brace the front posts, N, by wooden braces O, and the rear posts, N', by wooden braces O', the upper ends of which braces are mortised, respectively, into the vertical stanchions and the rear ends secured to the sills D and C. Vertical bolts P secure the beams N², braces O and O', and posts N and N' properly together and to the sills. The same bolts P also secure the cross-beams E' and F to the sills, the last-named beams forming trusses. The driving-gear of the machine consists of the wheel A, mounted on axle R, which is journaled in bearings secured to beams D and C'.

To the outside of the spokes of the wheel A is bolted a large sprocket-wheel, S. Journaled upon and near the rear ends of the beams D and C' is a shaft, U', having secured to it sprocket-wheels U, U², and U³ of requisite size. A chain belt, T, connects the wheels S and U, imparting motion to the shaft U'. On the shaft R, inside of the beam C', I place a sleeve, $w$, having secured to it sprocket-wheels W W' and a V-faced pulley, W², of suitable dimensions. A collar, $y$, rigidly attached to the shaft R, is set between the sleeve $w$ and the hub of the wheel A to obviate friction. A chain belt actuated from the wheel U³ connects with a series of sprocket-wheels and belts operating the elevator and other parts. A chain belt, V, connects the sprocket-wheels U² with the sprocket-wheel W, thus imparting motion to the sleeve $w$ and its sprocket-wheels and pulley. A belt, X, connects the pulley W² with a V-faced pulley, Y, on the cylinder-shaft Y², and imparts motion to the cylinder. From the wheel W' a chain belt connects with a sprocket-wheel on the shaft of the picker behind the cylinder and actuates that.

What I claim as new and of my invention is—

The combination, with the main frame and the thrashing and separating devices of a traveling thrasher, a driving-wheel, and the axle upon which said wheel is mounted, of a sleeve loosely mounted on said axle, wheels W W' W², keyed to said sleeve, a collar, $y$, secured to said axle between the hub of the driving-wheel A and the said sleeve, and belts, as described, arranged to transmit motion to thrashing and elevating devices, substantially as described.

In testimony whereof I affix my signature in presence of two witnesses.

CHARLES K. MYERS.

Witnesses:
ELIHU B. STOWE,
J. B. WEBSTER.